United States Patent
Stokking et al.

(10) Patent No.: US 9,667,669 B2
(45) Date of Patent: May 30, 2017

(54) MANAGING ASSOCIATED SESSIONS IN A NETWORK

(75) Inventors: Hans Maarten Stokking, Wateringen (NL); Fabian Arthur Walraven, Groningen (NL); Mattijs Oskar van Deventer, Leidschendam (NL); Omar Aziz Niamut, Vlaardingen (NL)

(73) Assignees: Koninklijke KPN N.V., The Hague (NL); Nederlandse Organisatie Voor Toegepast-Natuurwetenschappelijk Onderzoek TNO, Delft (NL)

( * ) Notice: Subject to any disclaimer, the term of this patent is extended or adjusted under 35 U.S.C. 154(b) by 267 days.

(21) Appl. No.: 13/144,385

(22) PCT Filed: Jan. 19, 2010

(86) PCT No.: PCT/EP2010/000278
§ 371 (c)(1),
(2), (4) Date: Jul. 13, 2011

(87) PCT Pub. No.: WO2010/081744
PCT Pub. Date: Jul. 22, 2010

(65) Prior Publication Data
US 2011/0276705 A1    Nov. 10, 2011

(30) Foreign Application Priority Data

Jan. 19, 2009 (EP) ..................... 09000661

(51) Int. Cl.
*G06F 15/16* (2006.01)
*H04L 29/06* (2006.01)

(52) U.S. Cl.
CPC ...... *H04L 65/1069* (2013.01); *H04L 65/1083* (2013.01); *H04L 65/4007* (2013.01)

(58) Field of Classification Search
CPC . H04L 65/1016; H04L 65/1069; H04L 67/14; H04L 65/1083; H04L 65/4007;
(Continued)

(56) References Cited

U.S. PATENT DOCUMENTS 7,817,648 B2 * 10/2010 Rasanen .................... 370/401
8,289,965 B2 * 10/2012 Bugenhagen et al. ........ 370/392
(Continued)

FOREIGN PATENT DOCUMENTS

CN    1732665 A    2/2008
JP    2005-293065    10/2005
(Continued)

OTHER PUBLICATIONS

European Search Report, European Application No. 09000661 dated May 7, 2009.
(Continued)

*Primary Examiner* — Oanh Duong
(74) *Attorney, Agent, or Firm* — McDonnell Boehnen Hulbert & Berghoff LLP

(57) ABSTRACT

A method and a system for managing associated sessions in a network is described, wherein the network comprises a network element configured for managing associated sessions between the network and user equipment. The method comprises the steps of providing a composition session identifier for associating sessions in a network; exchanging the composition session identifier between a user equipment and the network element; and associating two or more sessions with the composition session identifier by exchanging the composition session identifier.

25 Claims, 10 Drawing Sheets

(58) Field of Classification Search
CPC ............ H04M 15/57; H04M 15/8228; H04M 2215/208; H04M 2215/7833
USPC .................. 709/223, 227–228, 203, 246
See application file for complete search history.

(56) References Cited

U.S. PATENT DOCUMENTS

| | | | | |
|---|---|---|---|---|
| 9,042,378 | B2* | 5/2015 | Rasanen | 370/354 |
| 2004/0125756 | A1* | 7/2004 | Lepore | H04L 29/06027 370/261 |
| 2006/0136557 | A1* | 6/2006 | Schaedler | H04L 29/06 709/203 |
| 2006/0230168 | A1* | 10/2006 | Sung | H04W 4/08 709/230 |
| 2007/0005990 | A1* | 1/2007 | Sathish | H04L 67/14 713/189 |
| 2007/0033249 | A1 | 2/2007 | Samdadiya et al. | |
| 2008/0089344 | A1* | 4/2008 | Jansson et al. | 370/395.2 |
| 2008/0144807 | A1* | 6/2008 | Zhou et al. | 379/395 |
| 2008/0268824 | A1* | 10/2008 | Allen et al. | 455/415 |
| 2008/0288644 | A1* | 11/2008 | Gilfix et al. | 709/227 |
| 2009/0177778 | A1* | 7/2009 | Turk | 709/227 |
| 2010/0080115 | A1* | 4/2010 | Yang et al. | 370/216 |
| 2010/0088698 | A1* | 4/2010 | Krishnamurthy | 718/1 |
| 2010/0121956 | A1* | 5/2010 | Hoffpauir | 709/227 |
| 2011/0238845 | A1* | 9/2011 | Keller et al. | 709/227 |

FOREIGN PATENT DOCUMENTS

| | | |
|---|---|---|
| WO | WO02/059787 | 8/2002 |
| WO | WO 2004-062229 A1 | 7/2004 |
| WO | WO 2007/035160 A1 | 3/2007 |
| WO | WO2007/101473 | 9/2007 |
| WO | WO 2008/121032 A1 | 10/2008 |

OTHER PUBLICATIONS

PCT International Search Report and Written Opinion, PCT International Application No. PCT/EP2010/000278 dated Feb. 15, 2010.

Rauschenbach, U. et al., "A Scalable Interactive TV Service Supporting Synchronized Delivery Over Broadcast and Broadband Networks", Fraunhofer White Paper of May 14, 2004, pp. 1-8.

Durand et al., "A Metadata Model Supporting Scalable Interactive TV Services," Multimedia Modeling Conference (Jan. 2005) 6 pages.

Rauschenbach et al., "A Scalable Interactive TV Service Supporting Synchronized Delivery Over Broadcast and Broadband Networks," International Broadcasting Conference 2014, Amsterdam, The Netherlands, 8 pages.

OMA, "Service Guide for Mobile Broadcast Services," Open Mobile Alliance, OMA-TS-BCAST_Service_Guide-V1_1-2008-07-07-D, Copyright 2008, Open Mobile Alliance Ltd., 213 pages.

Ericsson, "Personalized and Interactive TV Enabled by IMS," 284 23-001 Uen Rev A, Sep. 2008, 18 pages.

iNEM4U, "Deliverable: D5.1—Demo Scenarios," dated Dec. 24, 2008, Copyright iNEM4U Public, 29 pages.

iNEM4U, "Deliverable: 1.2—iNEM4U System Requirements and Technology Survey," dated Mar. 30, 2008, Copyright iNEM4U Consortium Public, 33 pages.

iNEM4U, "Deliverable: D1.1—iNEM4U Usage Scenarios," dated Apr. 30, 2008, Copyright iNEM4U Public, 58 pages.

ETSI-TS182-027 Technical Specification; "Telecommunications and Internet Converged Services and Protocols for Advanced Networking (TISPAN); IPTV Architecture; IPTV Functions Supported by the IMS Subsystem," European Telecommunications Standards Institute, dated Feb. 2008, 57 pages.

ETSI-TS182-028 Technical Specification; "Telecommunications and Internet Converged Services and Protocols for Advanced Networking (TISPAN); IPTV Architecture; Dedicated Subsystem for IPTV Functions," European Telecommunications Standards Institute, dated Jan. 2008, 38 pages.

ETSI-TS183-063 Technical Specification; "Telecommunications and Internet Converged Services and Protocols for Advanced Networking (TISPAN); IMS-Based IPTV Stage 3 Specification," European Telecommunications Standards Institute, dated Jun. 2008, 127 pages.

ETSI-TS183-064 Technical Specification; "Telecommunications and Internet Converged Services and Protocols for Advanced Networking (TISPAN); Dedicated IPTV Subsystem Stage 3 Specification," European Telecommunications Standards Institute, dated Oct. 2008, 46 pages.

* cited by examiner

MANAGING ASSOCIATED SESSIONS IN A NETWORK

CROSS REFERENCE TO RELATED APPLICATIONS

The present application is a national stage entry of PCT/EP2010/000278, filed Jan. 19, 2010, and claims priority to EP 09000661.0, filed Jan. 19, 2009, the entire contents of which is incorporated herein by reference.

FIELD OF THE INVENTION

The invention relates to managing associated sessions in a network, though not exclusively, to a method and a system for managing associated multimedia sessions in a network, a network element and a user equipment for use in such system and a computer program product for executing the method.

BACKGROUND OF THE INVENTION

The IP Multi-Media Subsystem (IMS) architecture is a unified architecture that supports a wide range of services enabled by the flexibility of Session Initiation Protocol (SIP). IMS is defined by certain 3GPP and 3GPP2 standards (such as 3GPP TS 22.228, TS 23.218, TS 23.228, TS 24.228, TS 24.229, TS 29.228, TS 29.229, TS 29.328 and TS 23.320 Releases 5-7).

In order to leverage the investments in the IMS infrastructure new types of multi-media services are developed. One type of IMS-enabled services regards the so-called combinational services also referred to as blended or composite services, which combine services of various platforms and make use of the functionalities and capabilities of various platforms and distribution techniques (e.g. phone, multicast, broadcast, television/video, content-on-demand etc.). A type of IMS-enabled services regards interactive multi-media services wherein the end-user is an active participant instead of a passive viewer.

Further enhancements of this type of IMS-enabled services may include an end-user and/or the network operator to compose a multimedia service from different multimedia streams. For example an end-user may compose a personalized multimedia service by enriching a main service, for example a TV broadcast (BC) with personally selected multi-media content, such as content-on-demand (CoD), user-generated content (UCG), etc., originating from different sources in the network.

An example of an implementation of such a personalized TV service in a state-of-the-art architecture is described in the article of Rauschenbacher et. al, "A scalable interactive TV service supporting synchronized delivery over broadcast and broadcast networks", a Fraunhofer white paper of May 14, 2004. In this document a system is described wherein the main content stream is transported over a DVB network in the form of a broadcast channel to a Home Media Server at the end-user location. In addition, multiple additional content streams may be transported via a broadband IP network to the Home Media Server. At the Home Media Server, these additional content streams may be synchronized with the main content stream and thus presented to the end-user (display) device in a synchronized manner.

One of the disadvantages of the scheme described in Rauschenbacher et. al is that all end-user display equipment needs to be connected directly to the Home Media Server (HMS) for consuming these enriched services. Another disadvantage is that the HMS is a type of equipment of substantial complexity and needs to have a robust design with the necessary processing power to realize the personalized TV service functionality. In short, the prior art only allows the managing of the enriched television experience by the end-user. Information regarding the relation between the different multimedia streams originating from different sources in the network and delivered as separate streams to user equipment only exists at the user equipment (HMS).

An exemplary network architecture, such as an IMS network, more in particular the IMS network elements managing the multimedia services in the IMS network, is however not aware of the fact that these multimedia sessions are used in combination by an end-user to generate a personalized multimedia service. It may however be convenient and/or even be necessary to manipulate the personalized television experience from within the network. For example, it may be convenient to simultaneously pause associated multimedia streams, that together form the personalized television experience, in order to deliver a targeted advertisement or a hurricane warning or other content to the end-user before resuming the personalized television experience. Also, reserving bandwidth in the network for all related streams may also be convenient. Another example whereby the network needs to know which streams are related is the situation of an incoming phone call. If a number of streams relate to a personalized television experience, and a number relate to individual download sessions or to a multimedia recording session on the background, it would be convenient if the network could only pause the streams related to the personalized television experience and not those related to the background download or recording sessions.

In WO2007/101473 describes an example of such a combinational service, where in response to the receipt of a incoming call, a TV program is recorded on a network personal video recording (NPVR) system. In this solution a broadcast stream (channel) is paused upon the receipt of an incoming call and recorded in the network. Upon the user's request, the content may be played from the moment it was paused as a unicast stream. This type of network intervention however only works for a single stream and does not work for the personalized television experience comprising a multiple of streams, possibly originating from different resources, in combination with the presence of one or more other active sessions to the same User Equipment Within the state-of-the-art IMS architecture, such streams, controlled by and/or originating from different resources would require the set-up of multiple parallel sessions. One session would comprise the stream with the main content and additional sessions for each of the additional streams would comprise the additional content items (for example different subtitles, voice-over, Picture in Picture, etc.). From a network perspective these sessions from the outside would all look the same and no different from other active recording, downloading, gaming, telephony or other sessions. Currently the IMS standards do not allow an end-user and/or the network to compose associated multimedia sessions and to collectively control and/or manage these associated multimedia sessions and their used network resources. Hence, there is a desire in the prior art for methods and systems for managing associated sessions in a network.

SUMMARY OF THE INVENTION

It is an object of the invention to reduce or eliminate at least one of the drawbacks known in the prior art and to provide in a first aspect of the invention a method for managing associated sessions in a network, the network comprising a network element configured for managing associated sessions between the network and user equipment. The method comprising the steps of: providing a composition session identifier (PSCID) for associating sessions in a network;
exchanging the composition session identifier between a user equipment and the network element; and, associating two or more sessions with the composition session by exchanging the composition session identifier.

The composition session identifier, if generated by the user equipment, or provided to the user equipment via a third party provider (such as via an Electronic Program Guide), may be sent to the network element where the session management takes place. Alternatively, the composition session identifier may be sent to the user equipment from or under control of the network element. The sending of such composition session identifier in either direction may be referred to as an 'exchange'. Exchange may take place at any moment, that is: during the set-up of a composition session; during the set-up of a multimedia session which is destined to be associated with a composition session; or at other moments during the session management.

The invention allows network centric administration of the composition session identifier at a network element or at a location accessible to a network element. Whenever a multimedia session is set up, either initiated by a network element or by the user equipment, and an allocated composition session identifier is exchanged, the multimedia session may be associated under control of the network element with a composition session identifier. That way it may be associated with other multimedia sessions that may have already been assigned to the same composition session identifier.

Further, the network centric association of sessions enables the management of a group of sessions from within the network separate from other sessions that are not part of the group. Hence, using the composition session identifier the group of sessions may be manipulated as if there where only one session. For example it allows collective pausing (for example in response to an incoming call, destined for the user equipment), replaying, diverting of the data streams associated with the group of sessions.

In addition, the invention enables intergroup management of the sessions. If for instance bandwidth constrains appear in the network and a group of sessions and one separate session to the same user equipment exists, the session management logic in the network element may select the separate session to be terminated, leaving the group of associated sessions intact.

Alternatively, if only one group of sessions is active, and their combined existence is vital to the delivery of for instance a personalized television experience to a user equipment, the network may determine that none of the sessions in the group may be terminated for reasons of bandwidth constrains. The session management logic, being aware of the association of sessions, may then be configured to look for another solution, such as downscaling one of the sessions within the group of sessions, such that the bandwidth constrains are alleviated.

In further embodiments, the method may comprise the step of initiating a composition session. Although in principle it may be sufficient to just generate a composition session identifier and store this in a place in the network under control of a network element, which is in charge of managing the associated sessions, there may be advantages in initiating a separate signaling session (composition session) as well. For instance such composition session may be used to exchange the composition session identifier between the user equipment and the network element. If no such composition session is initiated, the composition session identifier may be incorporated in the signaling of the individual sessions.

The composition session may be used for the management of associated sessions and various kinds of signaling between the user equipment and a network element associated with to this task. Such signaling may include agreeing on the duration of all sessions or negotiations regarding to bandwidth requirements (for all associated sessions together).

In addition, initiating such a composition session may provide for more effective use of resources in the network and on the user equipment. For example using a composition session network initiated teardown of associated sessions may require less signaling to the user equipment. Further, continuous screening of all signaling messages for the presence of a composition session identifier, and subsequently probing the service logic (whether in the user equipment or in the network element) for a next course of action may be avoided. Messages only related to individual sessions (within a group of associated sessions) may not require such probing.

Further by associating sessions to a composition session identifier which is assigned to a composite session, the associated sessions are automatically assigned to the composition session.

In one embodiment the method further comprises the steps of: the user equipment generating a composition session identifier; sending a request for initiating a composition session from the user equipment to the network element, the request comprising the composition session identifier.

In another embodiment the method further comprises the steps of: sending a request for initiating a composition session from the user equipment to the network element; the network element generating a composition session identifier in response to the receipt of the request; sending the composition session identifier to the user equipment.

In an alternative embodiment, the method further comprises the steps of: the user equipment receiving a composition session identifier (PSCID) from the network prior to the sending of a request for initiating a composition session from the user equipment to the network element; said request comprising said received composition session identifier. The PSCID may be received via an Electronic Program Guide (EPG). By selecting a channel and activating the composition session modus via the remote control, the PSCID may be sent to the network element, which may be interpreted by the network element as a request for initiating a composition session.

Hence, contrary to known schemes, the invention allows a network centric administration of groups of sessions using the composition session identifier. The administration may be located at the network element or at a location reachable by the network element. This provides the advantage that the network element itself may manage the associated sessions upon request from the network and/or upon triggers initiated by events in the network, without the prior intervention from the user equipment. The invention thereby enables a whole new spectrum of enhanced multimedia services. The network element for managing the group of associated sessions and/or composition session may for instance be configured to pause a plurality of associated multimedia sessions, (relating to a personalized TV service transmitted to a user equipment) upon the detection of an incoming call destined for the same user equipment. At the same time a downloading session, not being recognized by the network element as part of the associated sessions, may be left untouched and continue in the background. Such complex multi session service interaction is not possible in known systems.

In yet another embodiment the method further comprises the steps of: the user equipment initiating two or more sessions by sending two or more session initiation requests for a session, preferably using a SIP INVITE message, to the network element, each request comprising the composition session identifier.

In one embodiment the method further comprises the steps of: the network element initiating two or more sessions by sending two or more requests for a session, preferably using a SIP INVITE message, to the user equipment, each request comprising the composition session identifier.

In another embodiment the request for initiating a composition session further comprises one or more session identifiers and, optionally, resource reservation information and/or resource allocation information associated with the one or more sessions identified by the session identifiers.

In yet another embodiment the two or more sessions comprise at least one of a broadcast (BC) session associated with a BC identifier (BCServiceID), a content-on-demand (CoD) session associated with a CoD identifier (CoDID), a Targeted Advertisement Insertion (TAI) session associated with a TAI identifier, network personal video content (NPVC) session associated with a NPVR identifier (NPVR-ContentID, a user generated content (UGC) session associated with a UGC identifier, a Public Switched Telecommunications Network (PSTN) emulation session associated with a PSTN emulation identifier and/or a shared content (SC) session associated with a SC identifier. Said identifiers are all examples of session identifiers.

In a further embodiment the combined streams of the associated sessions are presented to the user as a personalized composed multimedia stream.

In an embodiment the network further comprises storage means, preferably a database wherein the method further comprises the step of: the network element storing the composition session identifier and the two or more associated session identifiers in the storage means.

In yet another embodiment the method further comprises the step of: modifying the composition session by adding one or more sessions to the composition session, by terminating, or modifying one or more sessions in the composition session and/or by transferring one or more sessions from the composition session to a further composition session or outside the composition session. The initiation of a modification may be directed by the User Equipment, sending a request thereto. Alternatively the initiation of a modification may be directed by the Network Element responsible for the session management. Typically, the session management may be a part of a Service Control Function in the network.

In yet another embodiment the network is an IP Multimedia Subsystem (IMS) network comprising an IMS core connected to a Service Control Function (SCF), the SCF being the network element configured for managing associated sessions between the network and the User Equipment.

In a further aspect the invention relates to a system for managing associated sessions in a network, the system comprising:
 a network element configured for managing associated sessions between the network and a user equipment; for exchanging a composition session identifier with a user equipment; and, for associating two or more sessions with the composition session by exchanging the composition session identifier;
 a user equipment configured for providing a composition session identifier for associating sessions in a network; for initiating a composition session; and, for exchanging the composition session identifier with the network element.

In yet a further aspect the invention relates to user equipment for use in a system as described above, wherein the user equipment comprises:
 an ID generator for generating a composition session identifier;
 a multimedia client configured for receiving the composition session identifier from the ID generator; for initiating a composition session and exchanging the composition session identifier with a network element; for initiating one or more multimedia sessions with the network element; and for exchanging the composition session identifier with the network element during the set up of the multimedia sessions.

In a further aspect the invention relates to a network element comprising:
 a session manager configured for exchanging a composition session identifier with a user equipment; for initiating, and or terminating and or modifying a composition session; and for setting up and modifying multimedia sessions;
 a storage means for storing composition session information, the composition session information comprising information regarding composition sessions and the associated sessions.

In one embodiment the network element further comprises: an ID generator for generating a composition session identifier;

The invention also relates to a computer program product comprising software code portions configured for, when run in the memory of a user equipment or a network element, executing the method steps as described above.

The invention will be further illustrated with reference to the attached drawings, which schematically will show embodiments according to the invention. It will be understood that the invention is not in any way restricted to these specific embodiments.

DETAILED DESCRIPTION

Figure 1:
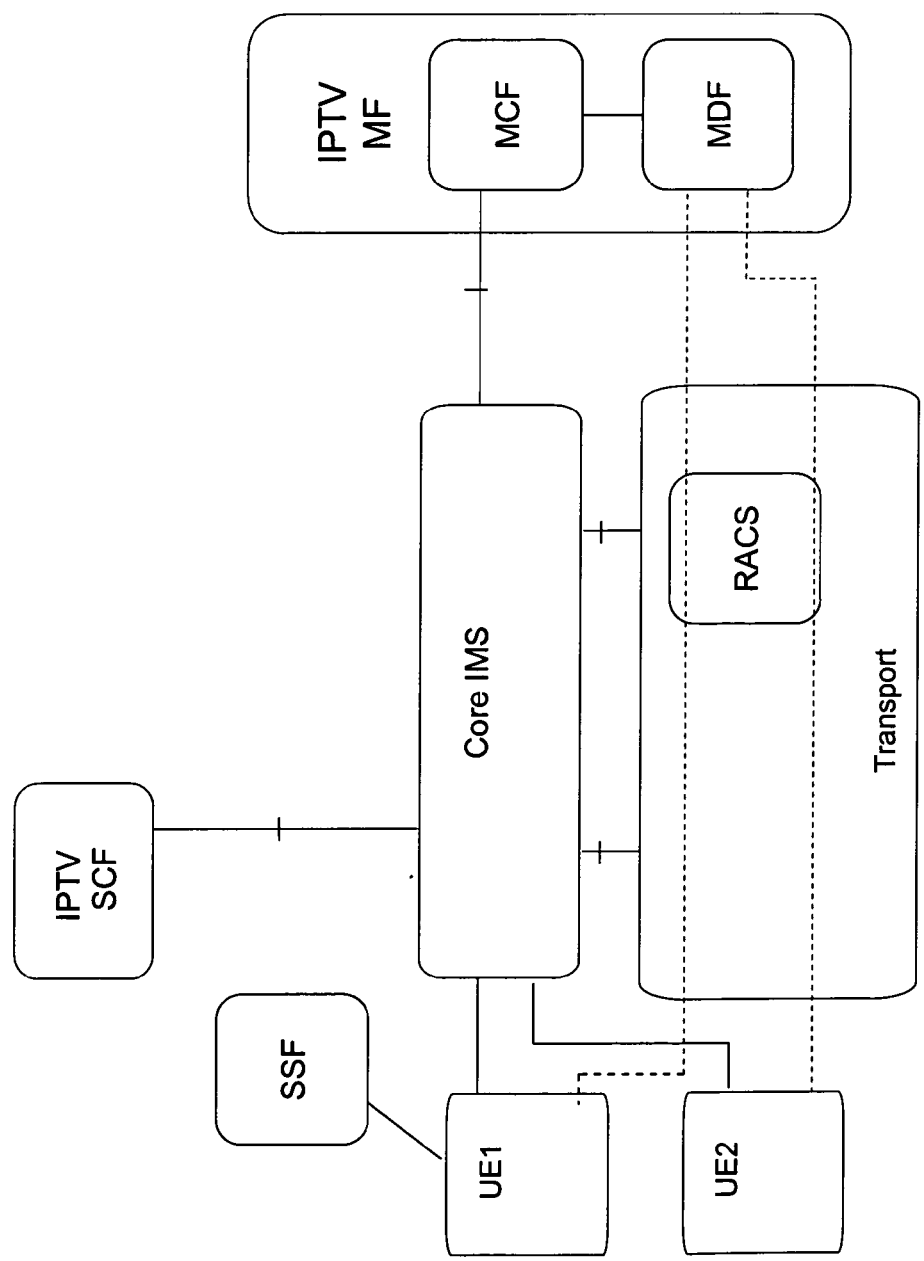
FIG. 1 depicts a system according to one embodiment of the invention.

FIG. 1 illustrates an example of an IMS-based IPTV system 100 as defined by ETSI TISPAN TS 182.027. The system is adapted for managing associated multimedia sessions according to a first embodiment of the invention. The system comprises an IMS core 102 formed by a set of Call/Session Control Functions (CSCF): a Proxy-CSCF (P-CSCF), an Interrogating-CSCF (I-CSCF) and an Serving-CSCF (S-CSCF). The IMS core is connected to User Equipment (UE) 104, IPTV service control functions (SCF) 106 for controlling IPTV services in the network (e.g. a broadcast SCF, a Content-on-Demand SCF, etc.) and to Media Functions (MF) 108 comprising Media Control Functions (MCF) and Media Delivery Functions (MDF) control the delivery of media contents via Transport Functions (TF) and Transport Control Functions (TCF) to the User Equipment.

Further, a Service Selection Function (SSF) 110 connected to the user equipment provides the user equipment with information about the available services using e.g. Electronic Programming Guide (EPG) and the Resource and Admission Control Subsystem (RACS) 112 manages resource usage and resource allocation for delivery of the media contents to the user equipment.

The User Equipment (UE) may be any type of equipment connectable via a network to a session management system. The User Equipment may relate to any type of desktop/laptop/handheld computer, PDA, mobile terminal, set-top box, Home Media Gateway, or any equivalent of those. In one embodiment, the network element comprising the session management system may be based on IMS architecture. It may for instance be a logical IMS network element referred to as a Service Control Function (SCF). Alternatively, the network element may be any other session management system performing functions which are equivalent to those of the SCF. The network connecting the UE to the network element may relate to any type of wireless or wired network. For the purpose of the invention, associated sessions are sessions that in order to enable new types of services require that they should not be managed independent from each other.

The IPTV system uses the Session Initiation Protocol (SIP) to set up and control sessions between user terminals or user terminals and the applications servers comprising the SCFs and MFs. The Session Description Protocol (SDP) carried by SIP signaling is used to describe and negotiate the media components in the session. Further, the Real Time Streaming Protocol (RTSP) is used for media control providing e.g. broadcast trick modes, Content-on-Demand (CoD) and Network Personal Video Recorder (NPVR) and the Real Time Transport Protocol (RTP) is used for media transport.

In order to allow the IPTV system to be aware of associated multimedia sessions, the SCFs and the user equipment are configured to setup composition sessions. A composition session allows both the user equipment and the network to keep track of and to control associated multimedia sessions. For the purpose of this invention, the composition session may also be referred to as PSC session, Composite session or Combi session. These are all equivalent terms used throughout this invention disclosure to indicate the same concept.

Upon initiation of such composition session a composition session identifier (PSCID) is generated and exchanged between the SCF and the user equipment using SIP messaging.

It is to be noted that for the purpose of the invention the terms PSCID, PSCid, PSC_Session_ID and Combi_session_ID are all equivalent/substitutable and/or interchangeable terms, used to indicate one and the same type of identifier.

The composition session identifier (PSCID) may be generated by the SCF or the user equipment. Alternatively, the PSCID may be provided by a third party provider (application server or AS), and provided via for instance an Electronic Program Guide (EPG) to the user equipment. After establishment of the composition session, multimedia sessions, e.g. broadcast sessions, CoD sessions, Targeted Advertisement Insertion (TAI) sessions, User-Generated Content (UGC) sessions, etc. may be associated with the composition session by adding the multimedia sessions to the composition session using the composition session identifier. An ensemble of sessions tied together by the PSCID, may be provided to the user equipment as a Personalized Service Composition service (PSC-service).

Addition of the multimedia sessions to a composition session may be realized for example by initiating a multimedia session using SIP, e.g. using the SIP INVITE message comprising the composition session identifier and the multimedia session identifier. Alternatively, addition to a composition session may be realized by adding an already existing (active) multimedia session to the composition session. This may be accomplished by modifying the existing multimedia session using SIP, e.g. using the SIP REINVITE message comprising the composition session identifier and the multimedia session identifier.

The SCF and the user equipment may keep track of the composition sessions and the multimedia sessions associated with each of these compositions sessions by storing for each composition session identifier the associated multimedia session identifiers in a session database 114 connected to the SCF and a memory for storing session information 116 in the user equipment respectively.

Further, the SCF and the user equipment are configured to modify and/or to terminate a composition session. For example in order to free up network resources to make room for the addition of another media session, the network may want to replace a HDTV broadcast session in a particular composition session with a normal broadcast session that occupies less bandwidth. In such a case, by using the session information stored in the session database, the SCF is able to identify and manipulate the relevant multimedia session associated with the composition session. Using the session information, the SCF may identify the HDTV broadcast session, terminate the HTDV broadcast session and add a new multimedia session relating to a Standard Definition TV stream (SDTV), which occupies less bandwidth, to the composition session. The modification of the composition session is registered in the session database and the memory of the user equipment by replacing the multimedia HDTV session identifier with the multimedia SDTV session identifier.

The session database in the network and the session information stored in the memory of the user equipment may thus keep track of newly generated composition sessions, modifications in existing composition sessions and/or terminations of composition sessions and thus allows network elements in the IMS network, such as the SCF to be aware of the presence of associated multimedia sessions.

Figure 2:
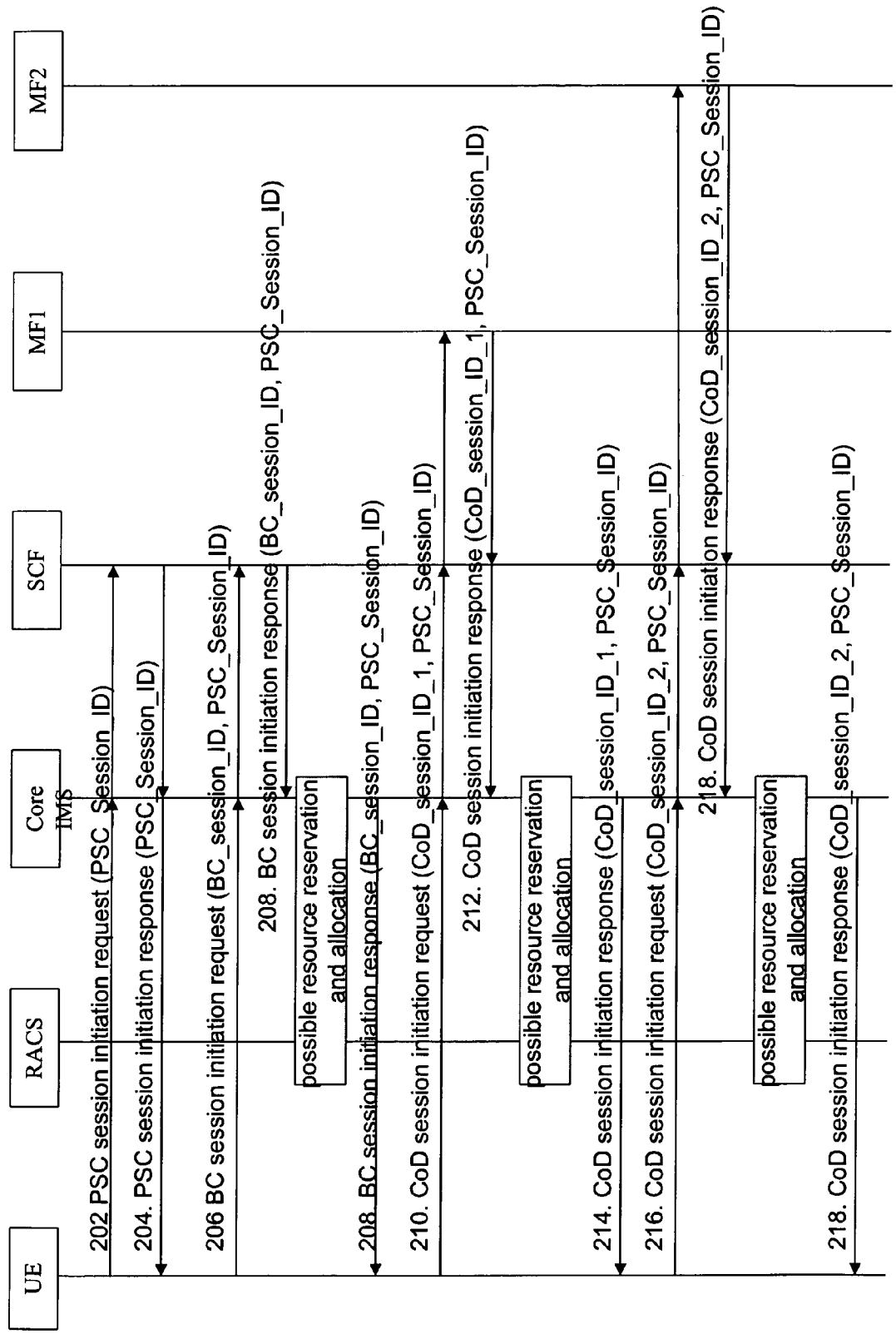
FIG. 2 depicts a flow diagram of a method according to one embodiment of the invention.

FIG. 2 depicts one exemplary protocol flow 200 representing the initiation of a composition session, in this case a personalized stream or service composition (PSC) session, using a composition session identifier and the subsequent association of three multimedia sessions to the composition session using the composition session identifier. In this example, the associated multimedia sessions comprise three sessions: a broadcast (BC) session comprising a first video stream and first and second Content-on-Demand (CoD)

sessions comprising a second and third video stream respectively. The first stream may comprise a TV broadcast, e.g. a sport game with a particular commentator, and the second and third stream may comprise two separate unicast streams originating from different sources in the network and comprising a second and third camera angle of the sports event, which may be presented to the user as two separate Picture-in-Picture modii, simultaneously with the TV broadcast.

The first, second and third video streams may be related to a personalized television program preconfigured in the SSF or, alternative, configured by the user using the program information provided by the SSF. Selection of the multimedia streams in the personalized television program (which is an example of a PSC service) may be realized by presenting Electronic Programming Guide (EPG) data provided by the SSF to the user. Using a remote control the user may compose its own personalized television program by selecting two or more multimedia streams from the set of multimedia streams presented to the user. Composing personalized television programs from multiple BC and/or CoD session offerings may require more complex EPG data as supported e.g. by the OMA BCAST service guide.

After having selected the multimedia streams, the user equipment generates a composition session identifier, in this case a personalized stream composition session identifier (hereafter: PSC ID), that is used by the user equipment (UE) and the network to correlate the different selected multimedia sessions to the PSC session. In one embodiment, the PSCID may be created by the UE prior to the actual selection of the offered sessions (for instance by entering PSC service modus through pressing a for this purpose configured button on the remote control). In another embodiment, the UE may receive the PSC via the EPG or may request it from the network element (such as a SCF) or from a third party AS. The user equipment stores the generated or received PSC ID and the selected BC and CoD multimedia identifiers in a memory used for storing session information.

Thereafter the PSC session is initiated by a PSC session initiation request. The PSC session may be initiated using the SIP protocol by sending a SIP INVITE comprising the PSC ID via the IMS core to the SCF (step 202). The PSC ID may be coded in the request URI of the SIP message. In further embodiments, the PSC ID may be implemented as a SIP Call ID (as defined in RFC 3261) in plain HTTP, or for instance in a SIP RTSP messageAlternatively the PSCID may be transported in a separate SIP INVITE or SIP INFO message to the SCF. Two examples of such a specially crafted SIP INVITE message are given below. The PSCID is shown in bold characters, in the SDP part of both SIP/SDP messages:

Example 1

SIP INVITE Message to Initiate a Broadcast (BC) Service (Session) as Part of a PSC Session

```
INVITE sip:bc-service@serviceprovider.com SIP/2.0
Via: SIP/2.0/UDP S-
CSCF.serviceprovider.com;branch=z9hG4bK776asdhds
Max-Forwards: 70
To: BC Service <sip:bc-service@serviceprovider.com>
From: STB1322499
<sip:STB1322499@serviceprovider.com>;tag=1928301774
Call-ID: a84b4c76e66710@pc33.serviceprovider.com
CSeq: 314159 INVITE
Contact: <sip:STB1322499@serviceprovider.com>
Content-Type: application/sdp
Content-Length: 142
v=0
o=STB1322499 2890844526 2890842807 IN IP4 126.16.64.4
s=Broadcast session
m=video 51372 RTP/AVP 33
c=IN IP4 225.2.17.12/127
a=recvonly
a=bc_service:tv:bbc1.co.uk
a=PSCid:873467631243@serviceprovider.com
b=AS:2000
```

Example 2

SIP INVITE Message to Initiate an Empty PSC Session

```
INVITE sip:PSC@serviceprovider.com SIP/2.0
Via: SIP/2.0/UDP S-
CSCF.serviceprovider.com;branch=z9hG4bK776asdhds
Max-Forwards: 70
To: PSC <sip:PSC@serviceprovider.com>
From: STB1322499
<sip:STB1322499@serviceprovider.com>;tag=1928301774
Call-ID: a84b4c76e66710@pc33.serviceprovider.com
CSeq: 314159 INVITE
Contact: <sip:STB1322499@serviceprovider.com>
Content-Type: application/sdp
Content-Length: 142
v=0
o=STB1322499 2890844526 2890842807 IN IP4 126.16.64.4
s=PSC session
a=PSCid:873467631243@serviceprovider.com
```

The SCF acknowledges the initiation of PSC session by sending a PSC session initiation response back to the user equipment (step 204). The response may be a SIP 200 OK response comprising the PSC ID. Further, the SCF stores the newly created PSC ID in the session database. An example of such an especially crafted SIP OK message is illustrated here below:

Example 3

SIP 200 OK Message to Confirm a BC Service Within a PSC Session

```
SIP/2.0 200 OK
Via: SIP/2.0/UDP S-
CSCF.serviceprovider.com;branch=z9hG4bK776asdhds
To: BC Service <sip:bc-service@serviceprovider.com>;tag=876567465
From: STB1322499
<sip:STB1322499@serviceprovider.com>;tag=1928301774
Call-ID: a84b4c76e66710@pc33.atlanta.com
CSeq: 314159 INVITE
Contact: <sip:bc-service@serviceprovider.com>
Content-Type: application/sdp
Content-Length: 131
v=0
o=STB1322499 2890844526 2890842807 IN IP4 126.16.64.4
s=Broadcast session
m=video 51372 RTP/AVP 33
c=IN IP4 225.2.17.12/127
a=recvonly
```

-continued

```
a=bc_service:tv:bbc1.co.uk
a=PSCid:873467631243@serviceprovider.com
b=AS:2000
```

Then the user equipment may initiate the selected BC session using the session information, i.e. the PSC ID and the newly generated BC multimedia session ID, stored in its memory. Initiation of the BC session may be realized by using adapted standard procedures as defined in ETSI TS 182 027 section 8.1.3 and ETSI TS 183 063 section 5.3.1. The adaptation of the standard procedures regards the inclusion in the initiation request of the PSC-ID of the PSC session of which the BC multimedia session is part of. This parameter may be included e.g. as a parameter in the request-URI of a SIP INVITE used to setup the session. Hence, the BC session is initiated by sending a BC initiation request comprising the newly generated BC multimedia session ID and the PSC ID to the SCF (step 206). During session setup, resources in the network may be verified and reserved by the RACS for and/or allocated to the BC multimedia session.

After having received the BC initiation request, the SCF stores the BC multimedia session ID hierarchically under the PSC ID in the session database and acknowledges the initiation of BC multimedia session by sending a response message, e.g. SIP 200 OK message, comprising the BC multimedia session ID and the PSC ID to the user equipment/UE (step 208).

Next, a first CoD session is setup. This may be done e.g. by using adapted standard procedures as defined in ETSI TS 182 027 section 8.4.1 and ETSI TS 183 063 section 5.3.2. The adaptation of the standard procedures regards the inclusion in the CoD initiation request of the PSC-ID of the PSC session of which the CoD session is part of. This parameter may be included e.g. as a parameter in the request-URI of a SIP INVITE used to setup the session. Hence, the CoD session is initiated by sending a CoD initiation request comprising a newly generated CoD multimedia session ID and the PSC-ID via the SCF to a first multimedia function MF1 controlling the CoD media content (step 210).

In response the MF1 replies to the SCF with an acknowledgement message, e.g. a SIP 200 OK, comprising the CoD multimedia session ID and the PSC_ID. The SCF then stores in response the CoD multimedia session ID hierarchically under the PSC-ID in the session database. Thereafter the acknowledgement message is sent to the user equipment/UE (step 212). During the first CoD session setup, resources in the network may be reserved by the RACS for and/or allocated to the CoD multimedia session.

In a similar manner a second CoD session is setup to a second media function MF2 (steps 214 through 218). Also the initiation of the second CoD session is registered in the session database by the SCF, that stores the second CoD multimedia session ID also hierarchically under the same PSC-ID as the one used to hierarchically store the first coD multimediasession in the database.

Figure 3:
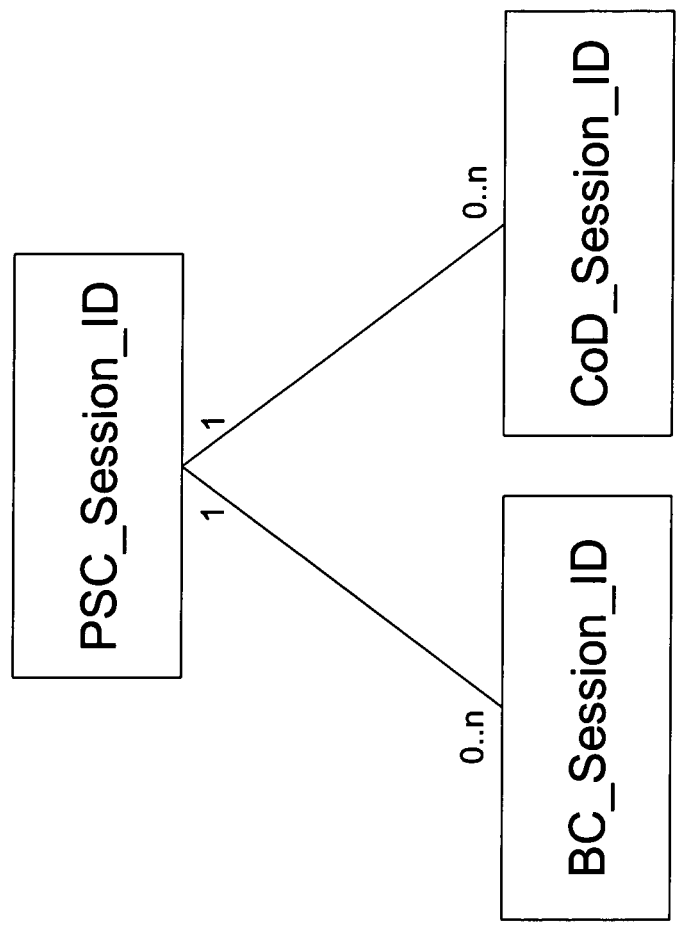
FIG. 3 depicts a data structure of session information according to one embodiment of the invention.

Using the steps as described above a PSC session is created containing one BC multimedia session and 2 CoD multimedia sessions. Both SCF and UE may keep track of the PSC session and which media sessions it contains using e.g. a data model as shown in FIG. 3. This exemplary figure shows that one PSC session may be empty or contain 1 or more BC sessions and/or 1 or more CoD sessions. Of course BC and CoD sessions are just examples of sessions that may be associated, using the invention.

In a variant (not shown) of the process flow depicted in FIG. 2, it is the SCF instead of the user equipment which initiates a PSC session. To that end the PSC session initiation request, which is sent to the SCF (step 202 in FIG. 2) comprises the PSC ID and the selected BC and CoD multimedia identifiers relating to the BC and CoD multimedia sessions to be associated to the PSC session. Furthermore, the request may comprise handling instructions, for example instructions for the SCF how to handle a situation wherein insufficient bandwidth is available in (parts of) the network for all requested BC and CoD sessions to be active(d) at the same moment. Using the information in the request, the SCF subsequently initiates the requested multimedia PSC session in a similar way as described in relation to FIG. 2. This variant has the advantage that the SCF can e.g. first determine, e.g. in combination with the RACS, if sufficient network resources are available. If this is the case, the SCF sets up the different sessions. If this is not the case, the SCF sends a PSC session reject message to the UE. Other reasons for rejecting a PSC session may include, but are not limited to, insufficient prepaid balance, authorization failure because of subscription restrictions, etc.

Figure 4:
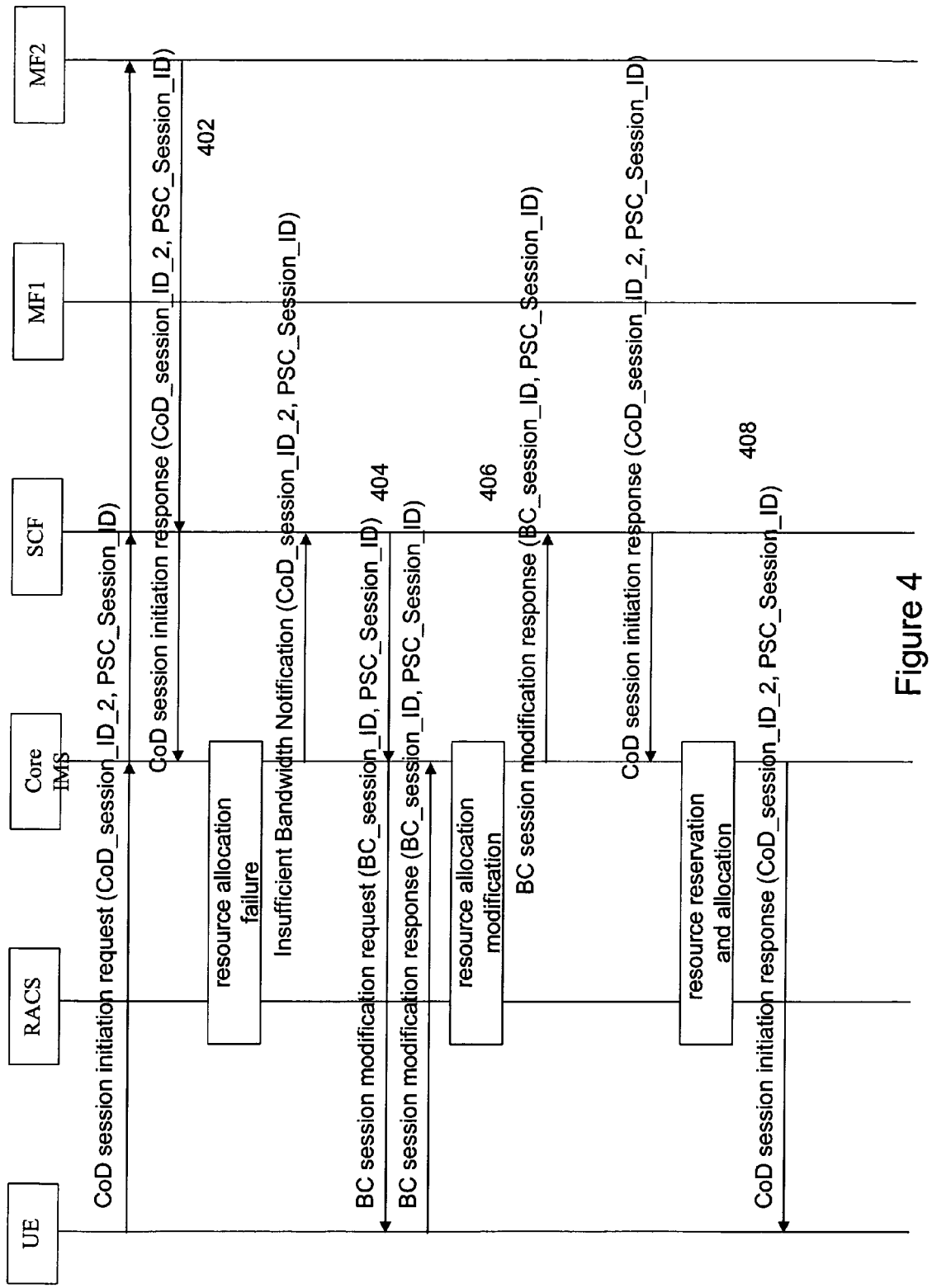
FIG. 4 depicts a flow diagram of a method according to another embodiment of the invention.

FIG. 4 depicts an exemplary use of the PSC session as described above in relation to FIG. 2. In this example a PSC session similar to the one described in relation with FIG. 2 is set up. However in this case the second CoD multimedia session setup fails because the RACS informs the SCF that insufficient bandwidth is available for the second CoD session (step 402).

Because the SCF is aware of the particular association between the different media sessions in the PSC session (in that these media sessions should be active simultaneously to create the requested personalized broadcasting/TV service), the SCF causes the network to manage bandwidth usage of the PSC session as a whole. The SCF may to that extend be configured as follows: In response to the notification from the IMS Core that insufficient bandwidth is available, the SCF service logic causes the BC multimedia session—in this case comprising a high bandwidth HDTV stream—to be modified using a session modification e.g. as described in procedures in TS 182 027 section 8.3.2 and TS 183 063 section 5.1.3.2.

Therefore, in response to the insufficient bandwidth notification, the SCF sends a BC session modification request comprising the BC multimedia session ID and the PSC-ID to the user equipment (steps 404). In response to the receipt of this request, the user equipment (UE) may automatically select a low bandwidth alternative for the initially selected HDTV stream. Alternatively, the UE may allow the user to select an alternative, low bandwidth TV stream, such as for example Standard Definition TV stream (SDTV). An example of such a modification request message is shown below:

Example 4

SIP Re-INVITE Message to Modify a BC Service to Add it to a PSC (This may be for instance a second/third/ . . . SIP INVITE within a SIP dialog)

```
INVITE sip:bc-service@serviceprovider.com SIP/2.0
Via: SIP/2.0/UDP S-
CSCF.serviceprovider.com;branch=z9hG4bK776asdhds
```

-continued

```
Max-Forwards: 70
To: BC Service <sip:bc-
service@serviceprovider.com>;tag=876567465
From: STB1322499
<sip:STB1322499@serviceprovider.com>;tag=1928301774
Call-ID: a84b4c76e66710@pc33.serviceprovider.com
CSeq: 314159 INVITE
Contact: <sip:STB1322499@serviceprovider.com>
Content-Type: application/sdp
Content-Length: 142
v=0
o=STB1322499 2890844526 2890842807 IN IP4 126.16.64.4
s=Broadcast session
m=video 51372 RTP/AVP 33
c=IN IP4 239.2.17.12/127
a=recvonly
a=bc_service:tv:bbc1.co.uk
a=PSCid:873467631243@serviceprovider.com
b=AS:2000
```

In this case, because a BC session modification does not cause it's BC session ID to change, also the PSCID and the other associated multimedia session IDs remain correct and do not have to be changed. Thereafter, a BC session modification response, which informs the RACS to modify the resource allocation, is sent via the IMS core (step 406) to the SCF. After the resource (re-)allocation is completed, sufficient bandwidth is available for the SCF to set up the second CoD session (step 408).

Figure 5:
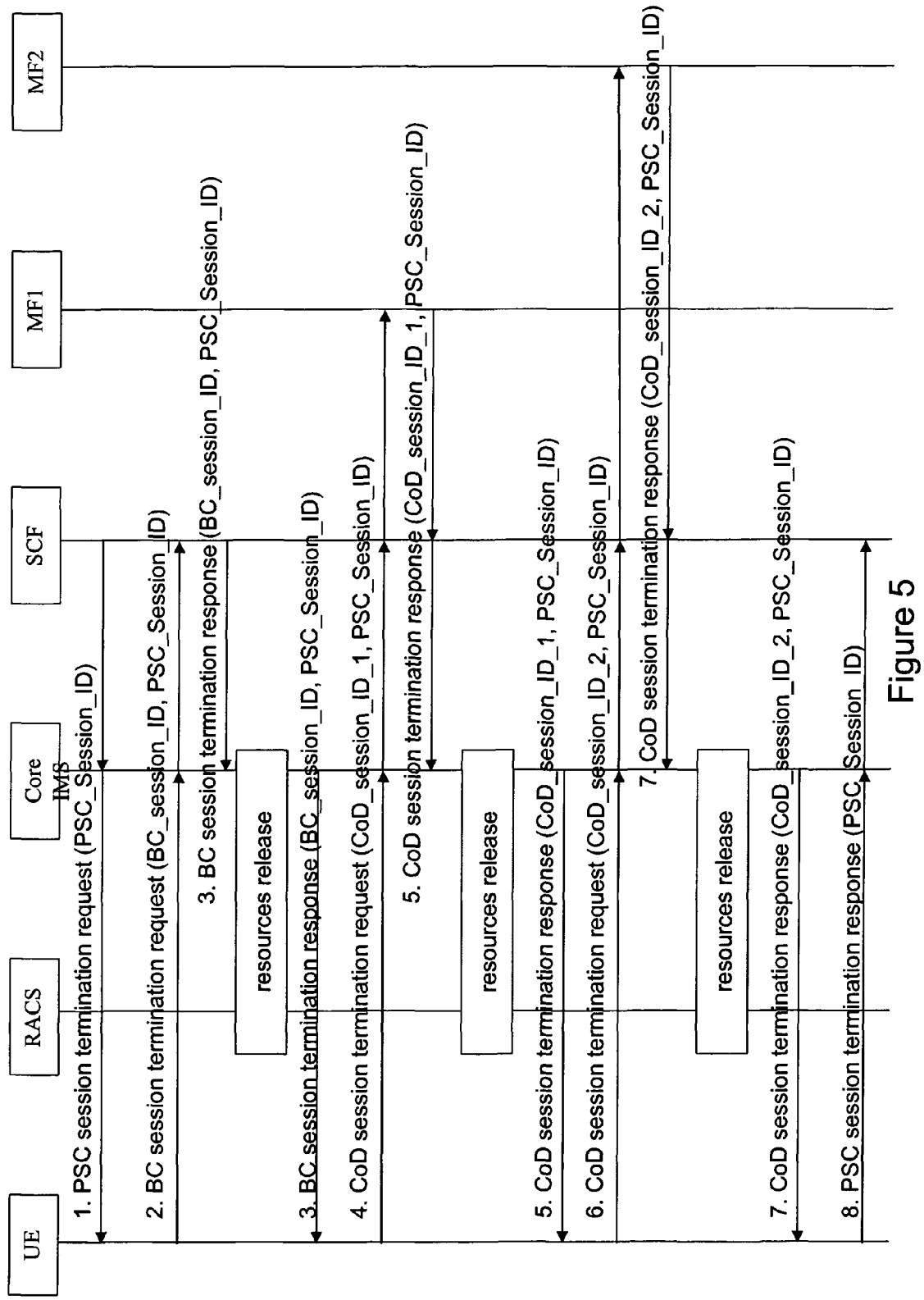
FIG. 5 depicts a flow diagram of a method according to yet another embodiment of the invention.

FIG. 5 depicts an example of a process flow regarding the termination of a PSC session as described above in relation to FIG. 2, wherein the termination is initiated by the network, in this case the SCF. Termination may for example be necessary because of parental control (the kids may only watch 2 hours of TV each day, after which it is terminated) or because a user has configured its set-top box such that for example as soon as a particular broadcasted show begins, he wants his channel to change to that show and therefore to end the PSC session (e.g. the personalized TV-experience) in favour of a regular (non-personalized) BC session. The SCF is now configured to, from a particular moment in time, end the PSC session and all linked associated sessions and to set-up a new session for receiving the regular broadcast.

An example of a termination message from an UE for terminating a session within a PSC session is illustrated here below:

Example 5

SIP BYE Message to Terminate a Session within a PSC

```
BYE sip:bc-service@serviceprovider.com SIP/2.0
Via: SIP/2.0/UDP S-
CSCF.serviceprovider.com;branch=z9hG4bK776asdhds
Max-Forwards: 70
To: BC Service <sip:bc-
service@serviceprovider.com>;tag=876567465
From: STB1322499
<sip:STB1322499@serviceprovider.com>;tag=1928301774
Call-ID: a84b4c76e66710@pc33.serviceprovider.com
CSeq: 314159 INVITE
Contact: <sip:STB1322499@serviceprovider.com>
Content-Type: application/sdp
Content-Length: 142
v=0
```

-continued

```
o=STB1322499 2890844526 2890842807 IN IP4 126.16.64.4
s=Broadcast session
a=PSCid:873467631243@serviceprovider.com
```

Figure 6:
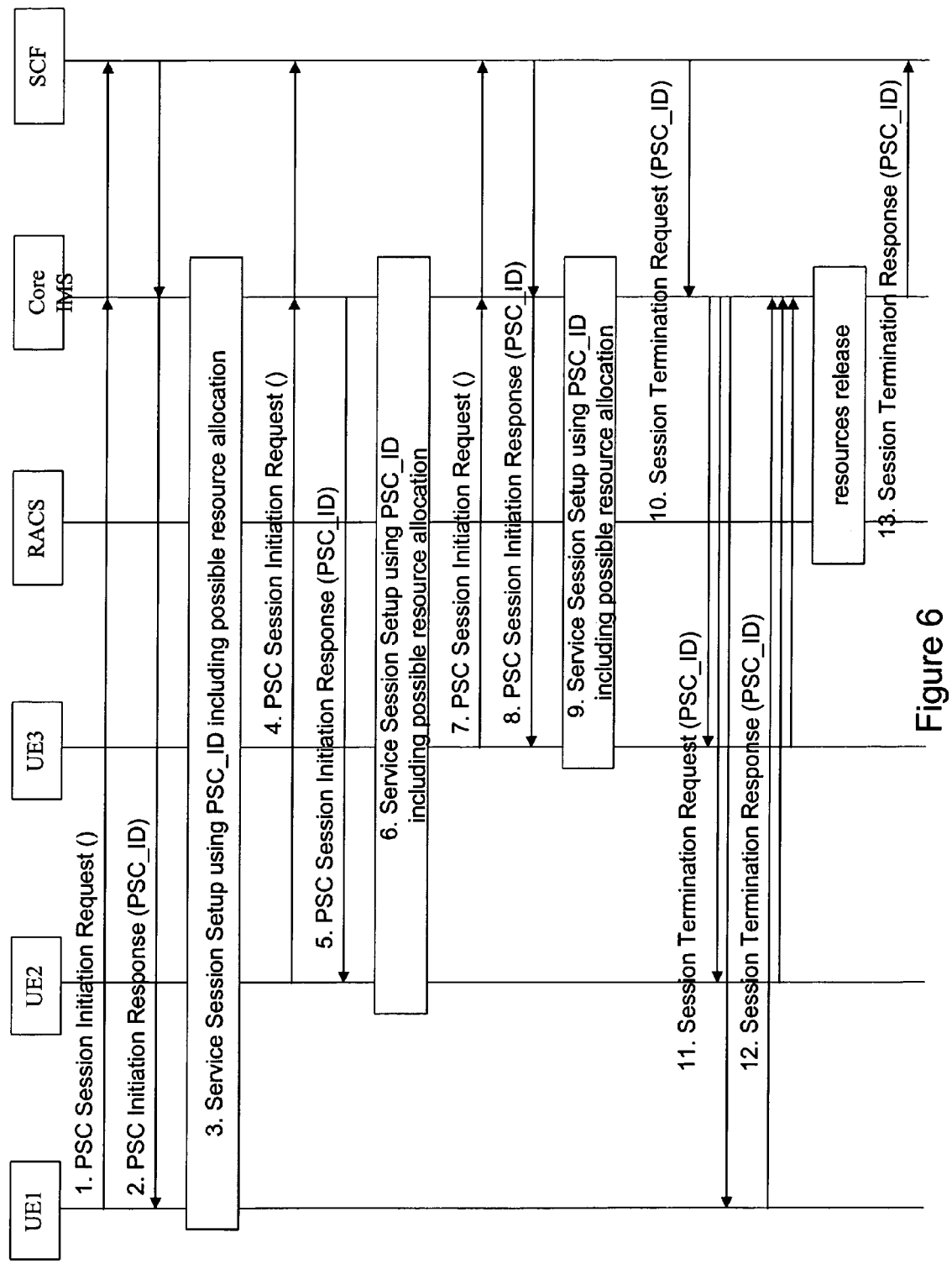
FIG. 6 depicts a flow diagram of a method according to a further embodiment of the invention.

FIG. 6 depicts a process flow 600 regarding a further use of a PSC session involving three different user terminals UE1,UE2,UE3. Different services, provided to different UEs, e.g. a television broadcast service to UE1, a telephony service to UE2 and a gaming service to UE3, are now added to one composition session, and hence associated with each other.

In this example, before the UE's set-up the sessions related to the respective services, first a PSC session (composite session) to the SCF is set up, using requests in steps 602, 606 and 610. Because an UE in this particular example does not know if such a composite session already exists, the individual UE's do not generate a composition session identifier, PSC-ID. Instead, the PSC-ID is generated by the SCF and subsequently sent back to the respective UE's. The PSCID will be the same for each UE1, UE2 and UE3 since all sessions will belong to the same PSC session. The SCF inserts the PSC-ID in the responses to the PSC session initiation requests, so the UE's may store this ID and the one or more associated multimedia session IDs. After becoming part of the PSC session, an UE may setup any multimedia session required for the PSC service and make those sessions part of the PSC session (steps 604-612).

In a further step 614 the SCF decides to tear down the PSC session, for example because the prepaid balance has run out or because of parental control which states that kids have to go to bed. In this case, the SCF may just send a termination request using the PSCID to tear down any service sessions belonging to the PSC session.

FIG. 6 relates to a situation wherein the PSC session is a multi-device session. In case of standardized IMS, such a session is currently not supported using the call-ID field for a PSCID. Nevertheless, because during session setup of this PSC session no port numbers or IP addresses need to be exchanged between terminals, such a multi-device session may be started without e.g. a conference bridge or similar session bridge. For the PSC session, only signalling messages need to be exchanged. So, the IMS core needs to be able to fork signalling messages, e.g. SIP messages, to the different devices part of the PSC session. This forking is normally done based on e.g. SIP URIs, but could also be done using any other part of a signalling message. If the PSCID is e.g. contained as a service parameter in the request URI, messages may be forked by the core IMS based on detection of the PSCID in this header field. This is done in FIG. 6 in step 616. The IMS core receives a session termination request from the SCF, and forks this message to all involved UEs, in this case UE1, UE2 and UE3.

Figure 7A:
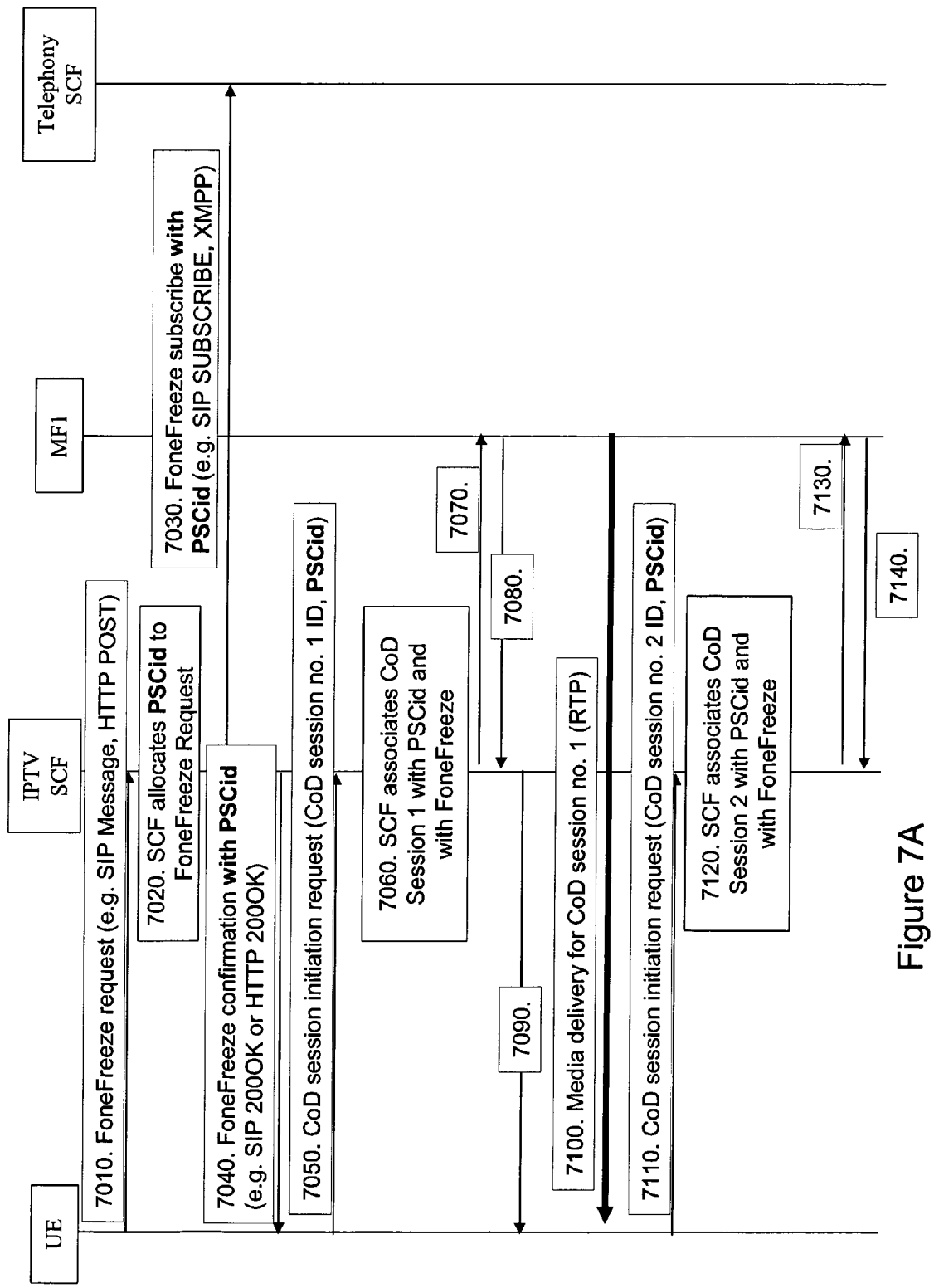
FIGS. 7A and B depict a flow diagram of a method according to an exemplary embodiment of the invention.
Figure 7B:
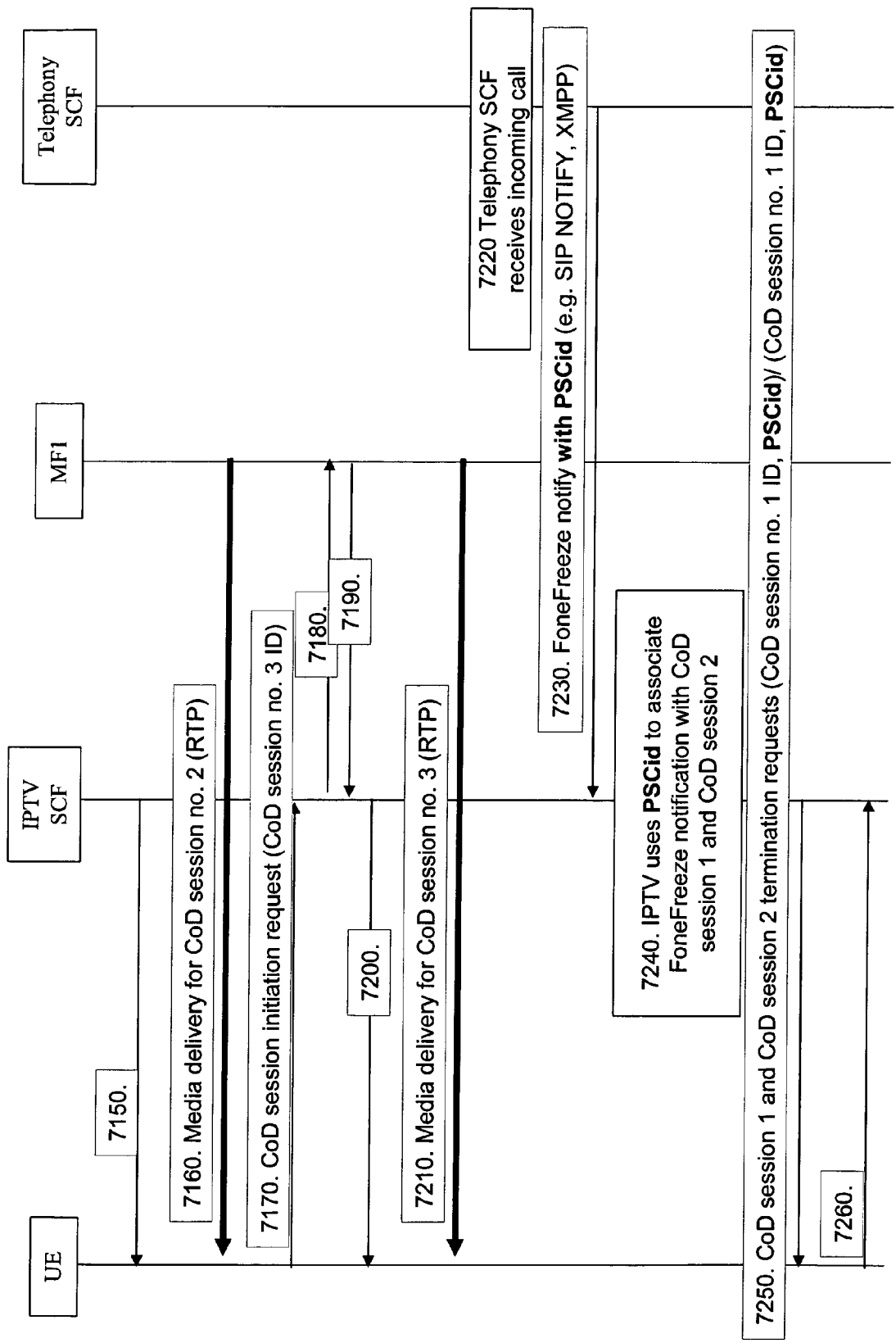

The following use case related to the FIGS. 7A and 7B demonstrates how the invention may be used when network based service intervention is required. In this particular embodiment three sessions to the user equipment, for instance a Home Media Gateway (HMG) are active at one time. Two CoD sessions are associated to a Composition Session Identifier PSCid and together form a PSC Service. For instance a personalized television experience wherein CoD session 1 comprises a main television view of a soccer match and CoD session 2 represents a small Picture in Picture (PIP) view of another angle of the soccer match, present as an overlay on the main view. CoD Session 3 is unrelated to the two other sessions, and comprise the downloading of a movie to a PVR in the HMG.

The user expects an important phone call during the consumption of the personalized television experience, which he has to take. He may want to watch the personalized television experience again after the phone call, or he may stop at all. What he doesn't want is that the CoD session 3, related to the downloading of a movie is however interrupted. The following is an exemplary sequence of steps to illustrate how the invention may be used in combination with a FoneFreeze service. It is demonstrated how the objectives of the user are accomplished.

More importantly this embodiment further demonstrates that the initiation of a composition session is not necessarily in all cases. The key is to associate related sessions by providing a composition session identifier and by exchanging this between the user equipment and the network element or elements in charge of the session management.

1) In a first step 7010, the UE sends a request for the FoneFreeze service. This request may be for instance in the form of a SIP MESSAGE message or an HTTP POST message.
2) In a second step 7020, the IPTV SCF (the network element) receives the request and generates a PSCid.
3) In step 7030, the IPTV SCF issues a FoneFreeze subscribe request to a Telephony SCF, including the PSCid. This subscribe request may be contained in a SIP SUBSCRIBE message or an XMPP SUBSCRIBE (RFC 3921)
4) In step 7040, the IPTV SCF confirms the FoneFreeze request including the PSCid. This response may be a SIP 200 OK message or an HTTP 200 OK message.
5) In step 7050 the UE sends a session initiation request for a COD session 1 including the PSCid and a COD session 1 ID to the IPTV SCF (in this step the PSCid is exchanged between the user equipment and the network element).
6) In step 7060 the IPTV SCF associates the COD Session 1 with the PSCid and therefore also with the FoneFreeze request.
7) In step 7070 the IPTV SCF forwards the message to MF1
8) In step 7080 the MF1 confirms CoD session 1 to IPTV SCF with a 200 OK message.
9) In step 7090 the IPTV SCF confirms CoD session 1 to UE with a 200 OK message.
10) In step 7100 the MF1 starts media delivery for CoD session 1 (delivery of video stream 1)
11) In step 7110 the UE sends a session initiation request for a COD session 2 including the PSCid and a COD session 2 ID to the IPTV SCF (in this step the PSCid is exchanged between the user equipment and the network element).
12) In step 7120 the IPTV SCF associates the COD Session 2 with the PSCid and therefore also with CoD session 1 and with the FoneFreeze request.
13) In step 7130 the IPTV SCF forwards the message to MF1
14) In step 7140 the MF1 confirms CoD session 2 to IPTV SCF with a 200 OK message.
15) In step 7150 the IPTV SCF confirms CoD session 2 to UE with a 200 OK message.
16) In step 7160 the MF1 starts media delivery for CoD session 2 (delivery of video stream 2)
17) In step 7170 the UE sends a session initiation request for COD session 2 without PSCid.
18) In steps 7180-7210 all of the steps 7130 to 7160 are repeated for the CoD session 3.
19) In step 7220 the Telephony SCF receives an incoming phone call.
20) In step 7230 the Telephony SCF sends notify message including PSCid, e.g. a SIP NOTIFY message or an XMPP status update.
21) In step 7240 the IPTV uses PSCid to associate FoneFreeze notification with CoD session 1 and CoD session 2
22) In step 7250 the IPTV SCF terminates CoD Session 1 and CoD Session 2, e.g. with SIP BYE messages (or suspends the session, or records the stream, or . . . )
23) In step 7260 the UE confirms the termination/suspension/recording of CoD session 1 and CoD session 2. The CoD session 3 is uninterrupted and continues, whilst the user can take his call.

Another example may be that the CoD sessions 1 and 2 form a personalized television experience viewed on a television set in the livingroom by a user 1, whilst the CoD session 3 is another television program connected to a terminal in another room, but via the same Home Media Gateway and hence for the network element the same subscriber/user equipment. One can immediately visualize the power of the invention concept in such situations.

Figure 8A:
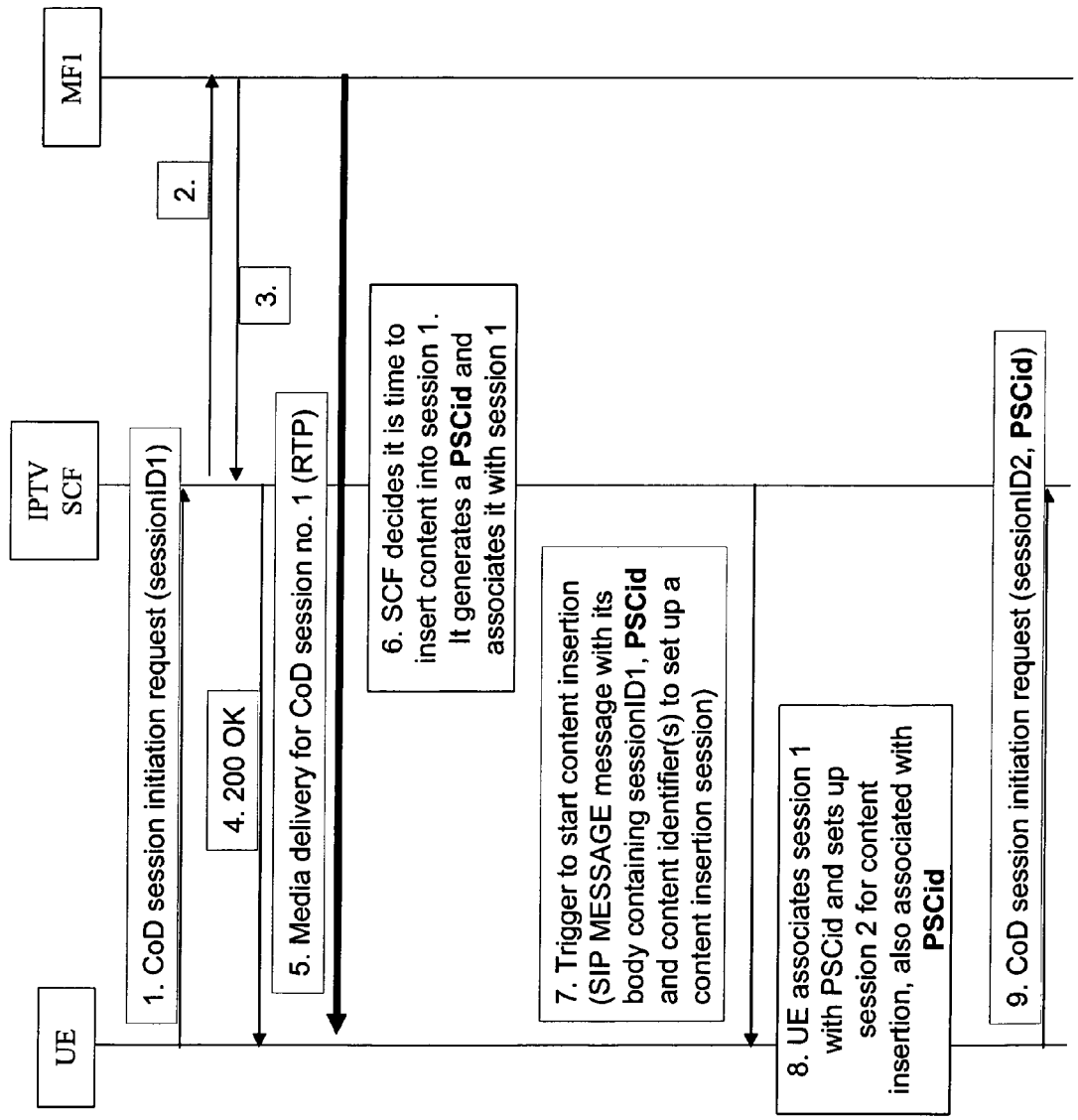
FIGS. 8A and B depict a flow diagram of a method according to a further embodiment of the invention.
Figure 8B:
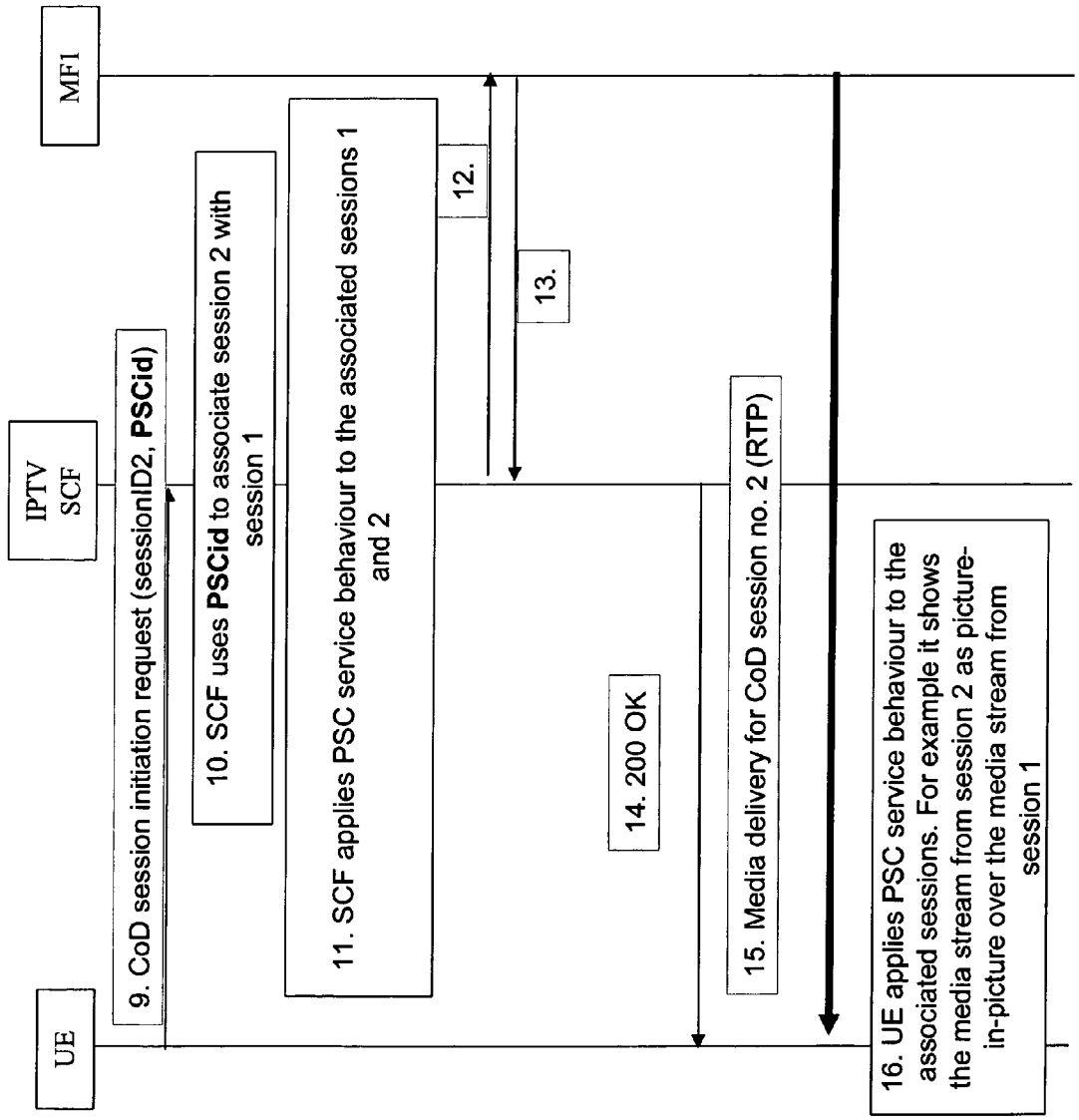

FIGS. 8A and B relate to another exemplifying embodiment of the invention. Just like the embodiment related to FIGS. 7A and B, it is not required to initiate a composition session. Here it is the network element that generates the PSCid and returns this to the User Equipment. Such an embodiment may be used for the insertion of advertisements in an existing CoD session. The steps shown in the figures are largely overlapping with those from other figures and are for the remainder self-explanatory to the skilled person.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method for managing associated sessions in a network, the network having a network element configured for managing associated sessions between the network and at least one user equipment, the method comprising:
   providing a composition session identifier for associating sessions in the network;
   after providing the composition session identifier, exchanging the composition session identifier between a user equipment and the network element a first time;
   associating two or more sessions with the composition session identifier by exchanging the composition session identifier at least a second time, wherein exchanging the composition session identifier at least a second time comprises the network element exchanging the composition session identifier with the user equipment;
   initiating establishment of a composition session, the composition session being a signaling session for facilitating management of the two or more sessions and exchanging the composition session identifier between the user equipment and the network element as part of said establishment, the composition session being different from the two or more sessions; and
   modifying the composition session, wherein modifying the composition session comprises using signaling in the composition session to terminate all of the two or more sessions.

2. The method according to claim 1, wherein providing the composition identifier comprises:
   the user equipment generating the composition session identifier; and sending a request for initiating the composition session from the user equipment to the network element, the request comprising the composition session identifier.

3. The method according to claim 2, wherein the request for initiating the composition session further comprises one or more session identifiers and, optionally, resource reservation information and/or resource allocation information associated with the one or more sessions identified by the session identifiers.

4. The method according to claim 1, wherein providing the composition identifier comprises:
sending a request for initiating the composition session from the user equipment to the network element;
the network element generating the composition session identifier in response to the receipt of the request for initiating the composition session; and
the network element sending the composition session identifier to the user equipment.

5. The method according to claim 4, wherein the request for initiating a composition session further comprises one or more session identifiers and, optionally, resource reservation information and/or resource allocation information associated with the one or more sessions identified by the session identifiers.

6. The method according to claim 1, wherein the method further comprises:
the user equipment initiating the two or more associated sessions by sending two or more session initiation requests for a session to the network element, each request comprising the composition session identifier.

7. The method according to claim 6, wherein the two or more associated sessions comprise at least one of a broadcast (BC) session associated with a BC identifier (BCServiceID), a content-on-demand (CoD) session associated with a CoD identifier (CoDID), a Targeted Advertisement Insertion (TAI) session associated with a TAI identifier, network personal video content (NPVC) session associated with a NPVR identifier (NPVRContentID), a user generated content (UGC) session associated with a UGC identifier, a Public Switched Telecommunications Network (PSTN) emulation session associated with a PSTN emulation identifier, or a shared content (SC) session associated with a SC identifier.

8. The method according to claim 1, wherein the method further comprises:
the network element initiating the two or more associated sessions by sending two or more requests for a session to the user equipment, each request comprising the composition session identifier.

9. The method according to claim 8, wherein the two or more associated sessions comprise at least one of a broadcast (BC) session associated with a BC identifier (BCServiceID), a content-on-demand (CoD) session associated with a CoD identifier (CoDID), a Targeted Advertisement Insertion (TAI) session associated with a TAI identifier, network personal video content (NPVC) session associated with a NPVR identifier (NPVRContentID), a user generated content (UGC) session associated with a UGC identifier, a Public Switched Telecommunications Network (PSTN) emulation session associated with a PSTN emulation identifier, or a shared content (SC) session associated with a SC identifier.

10. The method according to claim 1, wherein combined streams of the two or more associated sessions are presented to the user equipment as a personalized composed multimedia stream.

11. The method according to claim 1, wherein the network further comprises storage, the method further comprising:
the network element storing the composition session identifier and two or more associated session identifiers in the storage.

12. The method according to claim 1, the method further comprising:
modifying the composition session by at least one of (i) modifying at least one of the two or more sessions in the composition session, or (ii) transferring at least one of the two or more sessions from the composition session to a further composition session or outside the composition session.

13. The method according to claim 1, wherein the network is an IP Multimedia Subsystem (IMS) network comprising an IMS core connected to a Service Control Function (SCF), wherein the SCF is configured for managing associated sessions between the network and the User Equipment, wherein the network element is the SCF.

14. A non-transitory computer readable medium having stored thereon software instructions that, if executed by a user equipment or a network element, cause the user equipment or the network element to perform operations comprising the method according to claim 1.

15. A system for managing associated sessions in a network, the system comprising:
a network element; and
a user equipment,
wherein the network element is configured to (i) manage sessions between the network element and the user equipment, (ii) exchange a composition session identifier with the user equipment a first time, and (iii) associate two or more sessions with the composition session identifier by exchanging the composition session identifier at least a second time, wherein exchanging the composition session identifier at least a second time comprises the network element exchanging the composition session identifier with either the user equipment or a second user equipment different from the user equipment,
wherein the user equipment is configured to (i) provide the composition session identifier and (ii) after providing the composition identifier, exchange the composition session identifier with the network element, and
at least one of the network element or the user equipment is configured to initiate a composition session, the composition session being a signaling session for facilitating management of the two or more sessions and exchanging the composition session identifier between the user equipment and the network element, the composition session being different from the two or more associated sessions, and
wherein the network element is configured to modify the composition session using signaling in the composition session to terminate all of the two or more sessions.

16. The user equipment of claim 15, wherein the user equipment comprises:
an ID generator for generating the composition session identifier; and
a multimedia client configured to (i) receive the composition session identifier from the ID generator, (ii) exchange the composition session identifier with the network element, (iii) initiate one or more multimedia sessions with the network element, and (iv) exchange the composition session identifier with the network element during set up of the multimedia sessions.

17. The user equipment according to claim 16, wherein the user equipment is configured to initiate the composition session.

18. The network element of claim 15, wherein the network element comprises:
   a session manager configured to exchange the composition session identifier with the user equipment and to set up and modify multimedia sessions; and
   storage configured to store composition session information, the composition session information comprising information regarding composition session identifiers and the two or more associated sessions.

19. The network element according to claim 18, further configured for at least one of initiating, terminating or modifying the composition session.

20. The network element according to claim 18, the network element further comprising:
   an ID generator configured to generate the composition session identifier.

21. A method for managing associated sessions in a network, the network having a network element configured for managing associated sessions between the network and at least one user equipment, the method comprising:
   providing a composition session identifier for associating sessions in the network;
   after providing the composition session identifier, exchanging the composition session identifier between a user equipment and the network element a first time;
   associating two or more sessions with the composition session identifier by exchanging the composition session identifier at least a second time, wherein exchanging the composition session identifier at least a second time comprises the network element exchanging the composition session identifier with the user equipment;
   initiating establishment of a composition session, the composition session being a signaling session for facilitating management of the two or more sessions and exchanging the composition session identifier between the user equipment and the network element as part of said establishment, the composition session being different from the two or more sessions; and
   modifying, using signaling in the composition session, all of the two or more sessions.

22. The method according to claim 21, wherein modifying, using the composition session, comprises modifying at least one of the two or more sessions based on a determined change in bandwidth availability.

23. The method according to claim 21, wherein modifying the composition session, using the signaling in the composition session, comprises selectively pausing data streams of the two or more sessions in response to a detection of an incoming call destined for the user equipment.

24. The method according to claim 21, wherein modifying, using the signaling in the composition session, comprises signaling in the composition session a duration for all of the two or more sessions.

25. The method according to claim 21, wherein modifying, using the signaling in the composition session, comprises signaling in the composition session a bandwidth requirement for all of the two or more sessions.

* * * * *

(12) INTER PARTES REVIEW CERTIFICATE (3446th)
United States Patent
Stokking et al.

(10) Number: US 9,667,669 K1
(45) Certificate Issued: Feb. 9, 2024

(54) MANAGING ASSOCIATED SESSIONS IN A NETWORK

(75) Inventors: Hans Maarten Stokking; Fabian Arthur Walraven; Mattijs Oskar van Deventer; Omar Aziz Niamut

(73) Assignee: KONINKLIJKE KPN N.V.

Trial Number:

IPR2022-00557 filed Feb. 10, 2022

Inter Partes Review Certificate for:

Patent No.: 9,667,669
Issued: May 30, 2017
Appl. No.: 13/144,385
Filed: Jul. 13, 2011

The results of IPR2022-00557 are reflected in this inter partes review certificate under 35 U.S.C. 318(b).

INTER PARTES REVIEW CERTIFICATE
U.S. Patent 9,667,669 K1
Trial No. IPR2022-00557
Certificate Issued Feb. 9, 2024

AS A RESULT OF THE INTER PARTES REVIEW PROCEEDING, IT HAS BEEN DETERMINED THAT:

Claims 2, 3, 6 and 8 are found patentable.

Claims 1, 10-12, 21, 22, 24 and 25 are cancelled.

\* \* \* \* \*